United States Patent
Fang

(10) Patent No.: US 9,389,932 B2
(45) Date of Patent: Jul. 12, 2016

(54) SYSTEMS AND METHODS FOR REMOTE STORAGE MANAGEMENT

(71) Applicant: Zettar, Inc., Mountain View, CA (US)

(72) Inventor: Chin Fang, Mountain View, CA (US)

(73) Assignee: Zettar, Inc., Mountain View, CA (US)

( * ) Notice: Subject to any disclaimer, the term of this patent is extended or adjusted under 35 U.S.C. 154(b) by 0 days.

(21) Appl. No.: 13/781,572

(22) Filed: Feb. 28, 2013

(65) Prior Publication Data

US 2013/0179898 A1 Jul. 11, 2013

Related U.S. Application Data

(63) Continuation of application No. 12/806,028, filed on Aug. 3, 2010, now abandoned.

(60) Provisional application No. 61/332,747, filed on May 8, 2010, provisional application No. 61/230,998, filed on Aug. 3, 2009.

(51) Int. Cl.
*G06F 9/54* (2006.01)
*G06F 3/06* (2006.01)
*H04L 29/08* (2006.01)
*G06F 17/30* (2006.01)

(52) U.S. Cl.
CPC .............. *G06F 9/544* (2013.01); *G06F 3/0605* (2013.01); *G06F 3/067* (2013.01); *G06F 3/0661* (2013.01); *G06F 17/30979* (2013.01); *H04L 67/1097* (2013.01); *G06F 2206/1012* (2013.01)

(58) Field of Classification Search
CPC . G06F 9/544; G06F 17/30979; G06F 3/0661; G06F 3/0605; G06F 3/067; G06F 2206/1012; H04L 67/1097

See application file for complete search history.

(56) References Cited

U.S. PATENT DOCUMENTS

| | | | |
|---|---|---|---|
| 2007/0112937 A1 | 5/2007 | Rohani | |
| 2010/0027552 A1 | 2/2010 | Hill | |
| 2010/0325422 A1* | 12/2010 | Gnanasambandam | G06F 17/30082 713/153 |
| 2011/0022642 A1* | 1/2011 | deMilo et al. | 707/805 |

* cited by examiner

*Primary Examiner* — Syed Roni
(74) *Attorney, Agent, or Firm* — Sheppard, Mullin, Richter & Hampton LLP

(57) ABSTRACT

A system comprises a first storage resource, a second storage resource, a hosted application, a proxy engine, and a proxy interface. The first storage resource stores first data and uses a first program interface for communicating the first data. The second storage resource stores second data and uses a second program interface for communicating the second data. The hosted application uses application data, the first data and/or the second data including the application data. The proxy engine directs application data requests by the hosted application to the first storage resource or to the second storage resource. The proxy interface uses the first program interface to communicate with the first storage device and the second program interface to communicate with the second storage device to respond to the application data requests.

29 Claims, 13 Drawing Sheets

| Username | No. of Shares | Email Address | Role | Manager |
|---|---|---|---|---|
| admin | 0 | admin@localhost | Admin | |
| david | 1 | david@sbcglobal.net | Owner | jerry |
| dennis | 1 | dennis@stanford.edu | Owner | |
| jerry | 2 | jerry@yahoo.com | Reseller | jerry |
| joe | 4 | joe@gmail.com | Reseller | joe |
| plmogan | 3 | plmogan@sbcglobal.net | Owner | joe |
| stergios | 0 | stergios@gmail.com | Owner | |
| zack.perry | 1 | zack.perry@sbcglobal.net | Owner | joe |

FIG. 11

SYSTEMS AND METHODS FOR REMOTE STORAGE MANAGEMENT

CROSS REFERENCE TO RELATED APPLICATIONS

This application is a continuation of U.S. nonprovisional application Ser. No. 12/806,028, entitled "Systems and Methods for Remote Storage Management," filed Aug. 3, 2010, which claims priority to U.S. provisional application Ser. No. 61/230,998, entitled "A Method that Represents Different Storage Resources through a Unified and Ubiquitous Façade, Available through a Common Programming Interface, on a Computing Device," filed Aug. 3, 2009 by Chin Fang, and U.S. provisional application Ser. No. 61/332,747, entitled "A Method that Simplifies the Build up of a Private Storage Cloud, Enhances an Existing One, and Facilitates a Transparent Data Migration from one Storage Cloud to Another" filed May 8, 2010 by Chin Fang, all applications of which are hereby incorporated by reference herein.

BACKGROUND

1. Field of the Invention

Embodiments of the present invention are directed to data storage and more particularly to management of data storage.

2. Related Art

Remote and cloud based storage are becoming increasingly common. It is not uncommon for businesses, employees, and consumers to take advantage of remote storage and the ubiquitous accessibility that remote storage provides. For example, the Amazon S3 service may provide ample storage with availability anywhere over the Internet.

Cloud-based storage, such as systems by Amazon, Google, Microsoft, and EMC, are also becoming increasingly common and are often used by business to store a variety of different information. Different cloud-based storage systems may provide a variety of different functions, services, and benefits. Unfortunately, sharing data between different services is difficult. For example, different cloud-based services may have different application program interfaces (APIs) which may not be compatible. As a result, a business may be "locked in" to only using one service (e.g., the AWS S3 service) and unable to take advantage of benefits and functionality provided by other services.

SUMMARY OF THE INVENTION

In accordance with an embodiment of the invention, a system comprises a first storage resource operative to store first data thereon, the first storage resource using a first program interface for communicating the first data; a second storage resource operative to store second data thereon, the second storage resource using a second program interface for communicating the second data; a hosted application operative to use application data, the first data and/or the second data including the application data; a proxy engine for directing application data requests by the hosted application to the first storage resource or to the second storage resource; and a proxy interface using the first program interface to communicate with the first storage device and the second program interface to communicate with the second storage device, the proxy interface operative to respond to the application data requests by communicating via the first program interface with the first storage device or via the second program interface with the second storage device.

The proxy interface may include a graphical user interface for enabling a user to access the first storage resource and the second storage resource as a unified resource. The proxy interface may include an application program interface for enabling automatic access by the hosted application. The first storage resource may include one of local storage resource or network storage. The first program interface and the second program interface may use different storage protocols. The proxy interface may include a load balancing engine operative to balance the loads across the first storage resource and the second storage resource. The proxy interface may include a provisioning engine operative to provision additional storage resources as needed.

The first program interface may be operative for accessing the first storage resource and at least one other storage resource that uses a same protocol. The proxy interface may be operative to redirect requests by the hosted application. The system may further comprise a second hosted application operative to use second application data, the first data and the second data including the second application data. The proxy interface may include a caching engine for caching at least a portion of the application data. The proxy interface may include a permission engine operative to manage data access rights. The proxy interface may include an operating system component for redirecting file-system data requests. The proxy interface may include a migration engine operative to migrate data across storage resources.

In accordance with another embodiment of the invention, a method comprises storing first data on a first storage resource, the first storage resource using a first program interface for communicating the first data; storing second data on a second storage resource, the second storage resource using a second program interface for communicating the second data; receiving a data request from a hosted application that uses application data, the first data and the second data including the application data; directing the data request to the first storage resource or to the second storage resource; and using a proxy interface to communicate the data request to the first storage device or to the second storage device, the proxy interface using the first program interface to communicate with the first storage device or the second program interface to communicate with the second storage device.

The method may further comprise using a graphical user interface for enabling a user to access the first storage resource and the second storage resource as a unified resource. The method may further comprise using an application program interface for enabling automatic access by the hosted application. The first storage resource may include one of local storage resource or network storage. The first program interface and the second program interface may use different storage protocols. The method may further comprise using a load balancing engine to balance the loads across the first storage resource and the second storage resource. The method may further comprise using a provisioning engine operative to provision additional storage resources as needed. The method may further comprise using the first program interface for accessing at least one other storage resource that uses a same protocol as the first storage resource. The method may further comprise redirecting requests by the hosted application. The method may further comprise receiving a second data request from a second hosted application operative to use second application data, the first data and the second data including the second application data. The method may further comprise using a caching engine for caching at least a portion of the application data. The method may further comprise using a permission engine to manage data access rights. The method may further comprise using an operating system component for redirecting file-system data requests. The method may further comprise using a migration engine to migrate data across storage resources.

In accordance with yet another embodiment of the invention, a system comprises a first storage resource for storing first data, the first storage resource using a first program interface for communicating the first data; a second storage resource for storing second data, the second storage resource using a second program interface for communicating the second data; means for receiving a data request from a hosted application that uses application data, the first data and the second data including the application data; means for directing the data request to the first storage resource or to the second storage resource; and means for using a proxy interface to communicate the data request to the first storage device or to the second storage device, the proxy interface using the first program interface to communicate with the first storage device or the second program interface to communicate with the second storage device.

BRIEF DESCRIPTION OF THE DRAWINGS

FIG. 11 depicts a manage screen on a user interface in some embodiments.

DETAILED DESCRIPTION OF EXEMPLARY EMBODIMENTS

Applications that work with one service as the number of cloud-based storage systems increase, there is an increasing demand to utilize the full array of storage resources. For example, many users wish to take advantage of the benefits of different cloud-based storage solutions without being limited to a single solution (e.g., only using the Amazon S3 service and not a combination of services). Unfortunately, different cloud-based services utilize different APIs (e.g., program interfaces). Applications typically are not able to utilize multiple APIs. For example, an application written to use one API may not be ported to use a different API without significant changes. As a result, utilizing multiple cloud-based storage solutions is not feasible.

In some embodiments, systems and methods described herein may provide API to API translation thereby allowing computing systems to store data to multiple cloud-based storage providers. In various embodiments, modification of programs or operating systems are not necessary to achieve the translation.

In one example, an application may perform a program call which may be directed to a proxy engine and proxy interface which identify the program call and utilizes the API for the desired cloud-based storage. Data may be retrieved from the cloud-based storage and provided to the application in a similar manner. The proxy engine and/or proxy interface may utilize any API(s). Those skilled in the art will appreciate that the application may not be modified or reconfigured and still take advantage of the proxy engine and/or proxy interface.

In various embodiments, a file system representation may be generated that displays files as if the files were locally stored. The files, however, may be stored locally or remotely (e.g., in a cloud-based storage system). Further, parts of individual files may be stored on different storage devices (e.g., a file may be stored in two separate cloud-based storage services). The file system representation, however, may display the file as if the file was locally stored. If an application requests the file, the proxy engine and/or proxy interface may retrieve the file utilizing the correct APIs for each different storage device to retrieve and reassemble the file.

For example, multiple storage resources may be available as unified browsable resource (e.g., such as a web-based file system representation) through a graphical user interface (GUI). In some embodiments, the GUI allows a user to manage the files system as if the file system was a local resource. The GUI may also be used to provide the users the ability to provision resell, and bill storage space and/or access to the file system representation. The GUI may also provide users the ability to provision, resell, access and track utilization of storage resources.

Figure 1:
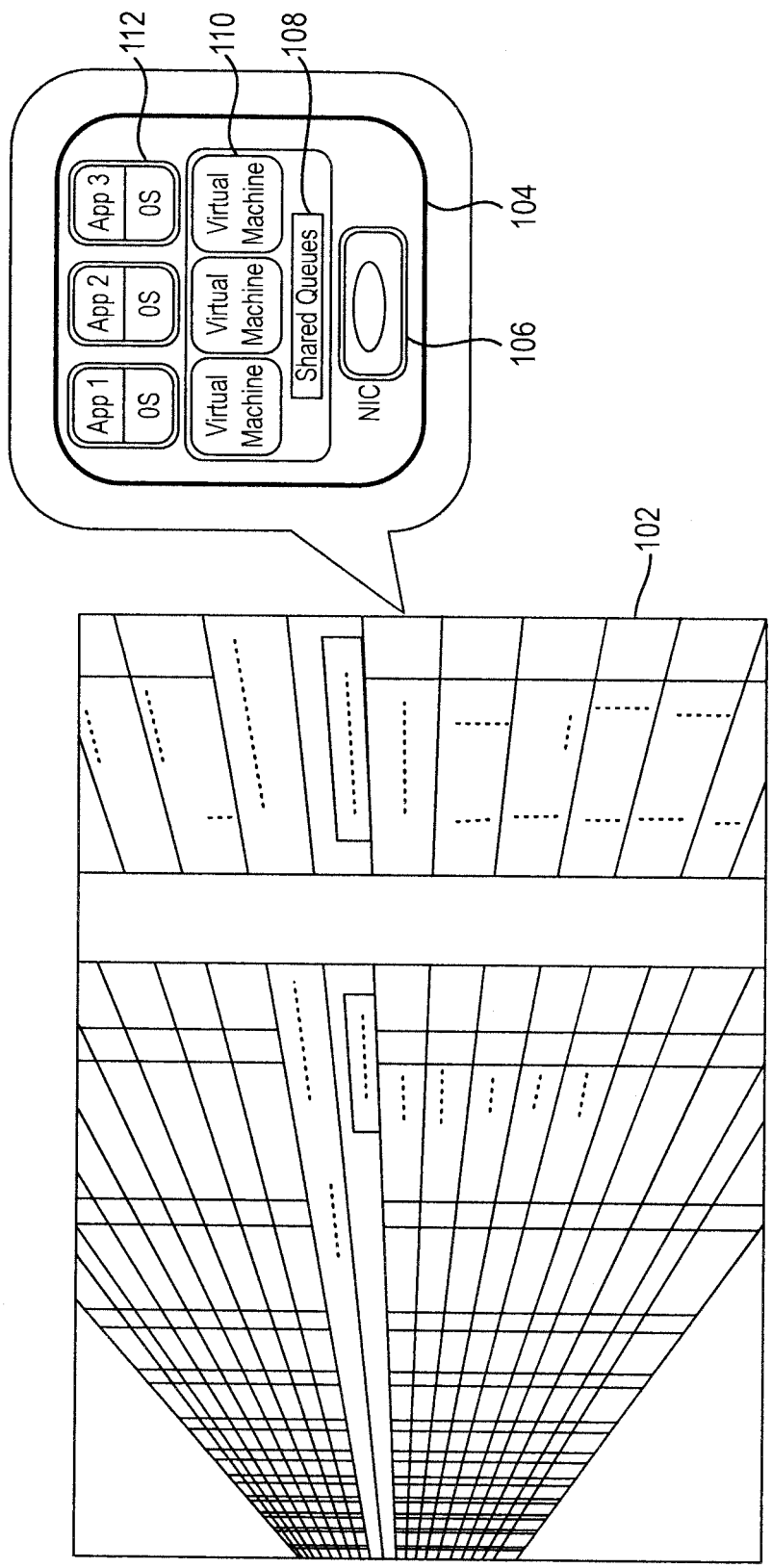
FIG. 1 depicts a group of hosted computers in some embodiments.

FIG. 1 depicts a group of hosted computers 102 in some embodiments. In some embodiments, a group of hosted computers 102 may be rack mounted. Those skilled in the art will appreciate that the hosted computers 102 need not be in racks or in any physical configuration that is in relationship to each other. Each hosted computer 104 of the group of hosted computers 102 may comprise a network interface card 106, a shared queue 108, one or more virtual machines 110, and one or more applications supported by one or more operating systems 112.

A storage resource is any resource that may be used to store, manage, and/or retrieve data. For example, the storage resource may comprise direct attached storage (DAS), network attached storage (NAS), storage area network (SAN), cloud-based storage, and/or remote storage accessed via a protocol such as, but not limited to, REST API or SOAP. Further, cloud-based storage is any storage resource that can be provisioned and is accessed via a data transfer protocol over a network.

A digital device is any device with a processor and memory such as a computer. A digital device is any device with a processor and memory. For example, a digital device may be a desktop computer, server, client, laptop, mobile device, cellular device, or the like. In some examples, systems and methods discussed herein may be implemented through a computer program with a graphical user interface. Although such a computer program is discussed, those skilled in the art will appreciate that embodiments may be performed using any of the following, either alone or in combination, including, but not limited to, a computer program, multiple computer programs, firmware, and/or hardware. Digital devices are further described herein.

Figure 2:
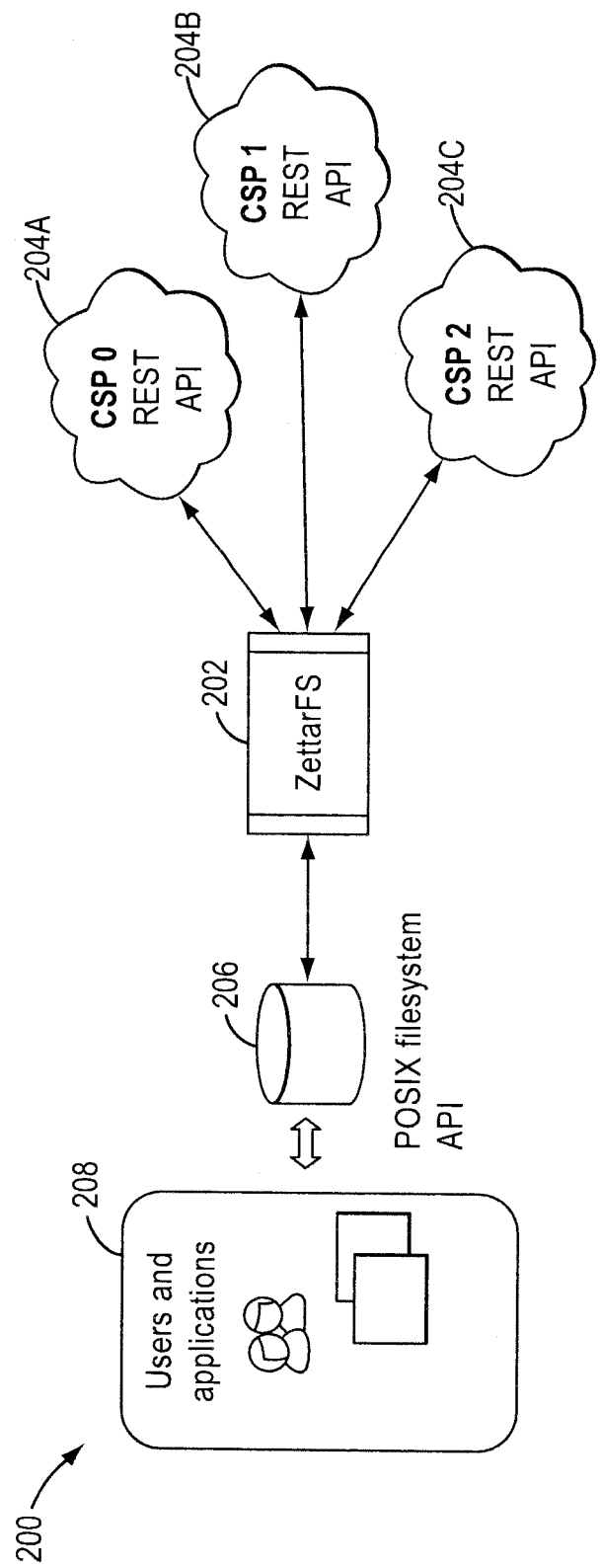
FIG. 2 depicts an exemplary environment in which some embodiments may be practiced.

FIG. 2 depicts an exemplary environment 200 in which some embodiments may be practiced. The exemplary environment 200 comprises a ZettarFS (Zettar File System) 202, a plurality of cloud storage systems 204a-c, a POSIX API file system 206, and a user/application environment 208. In some embodiments, a digital device comprises the ZettarFS 202, the POSIX API file system 206, and the one or more applications in the user/application environment 208. In other embodiments, a digital device 102 does not comprise the ZettarFS 202. Those skilled in the art will appreciate that any number of digital devices may comprise all or some of the ZettarFS (Zettar File System) 202, a plurality of cloud storage systems 204a-c, a POSIX API file system 206, and a user/application environment 208.

In some embodiments, the user and/or applications in the user/application environment 208 may interact with a POSIX API file system 206. The ZettarFS 202 may allow an application that communicates with a POSIX API file system 206 (such as that used by a UNIX operating system) to store data to and/or retrieve data from cloud storage systems 204a-c even though the cloud storage systems 204a-c provide the REST API.

In various embodiments, the ZettarFS 202 is a proxy engine and/or proxy interface that receives data (e.g., system calls, files, or the like) from the application and provides any necessary API functionality to enable storing data to or retrieving data from remote storage (e.g., cloud-based storage) without requiring that the application be modified.

Each cloud storage system 204a-c may be operated by a cloud service provider (CSP). In this example, each of the cloud storage systems 204a-c provide a REST API. Those skilled in the art will appreciate that various embodiments are not limited to a single API (e.g., not limited to the REST API) and that the cloud storage systems 204a-c may use a different API or any combination of APIs.

In various embodiments, a digital device may comprise the ZettarFS 202, the POSIX API file system 206, and the users/applications environment 208. For example, a digital device may comprise a UNIX operating system. The UNIX operating system may provide and/or implement the POSIX API. The ZettarFS may comprise software that is configured allow for communication (e.g., storage of data and/or retrieval of data) between applications of the digital device and the cloud storage systems 204a-c, even if the cloud storage systems 204a-c use an API (e.g., REST API) that is not the POSIX API. Those skilled in the art will appreciate that the ZettarFS 202 may allow for communication to or from cloud storage systems 204a-c with any type of API regardless if the one or more of the cloud storage systems 204a-c.

The POSIX API file system 206 may be any file system that utilizes the POSIX API. The users/application environment 208 may comprise one or more digital devices. The digital devices may comprise an operating system and one or more applications. Those skilled in the art will appreciate that various embodiments are not limited to a file system with the POSIX API by may be any API.

Figure 3:
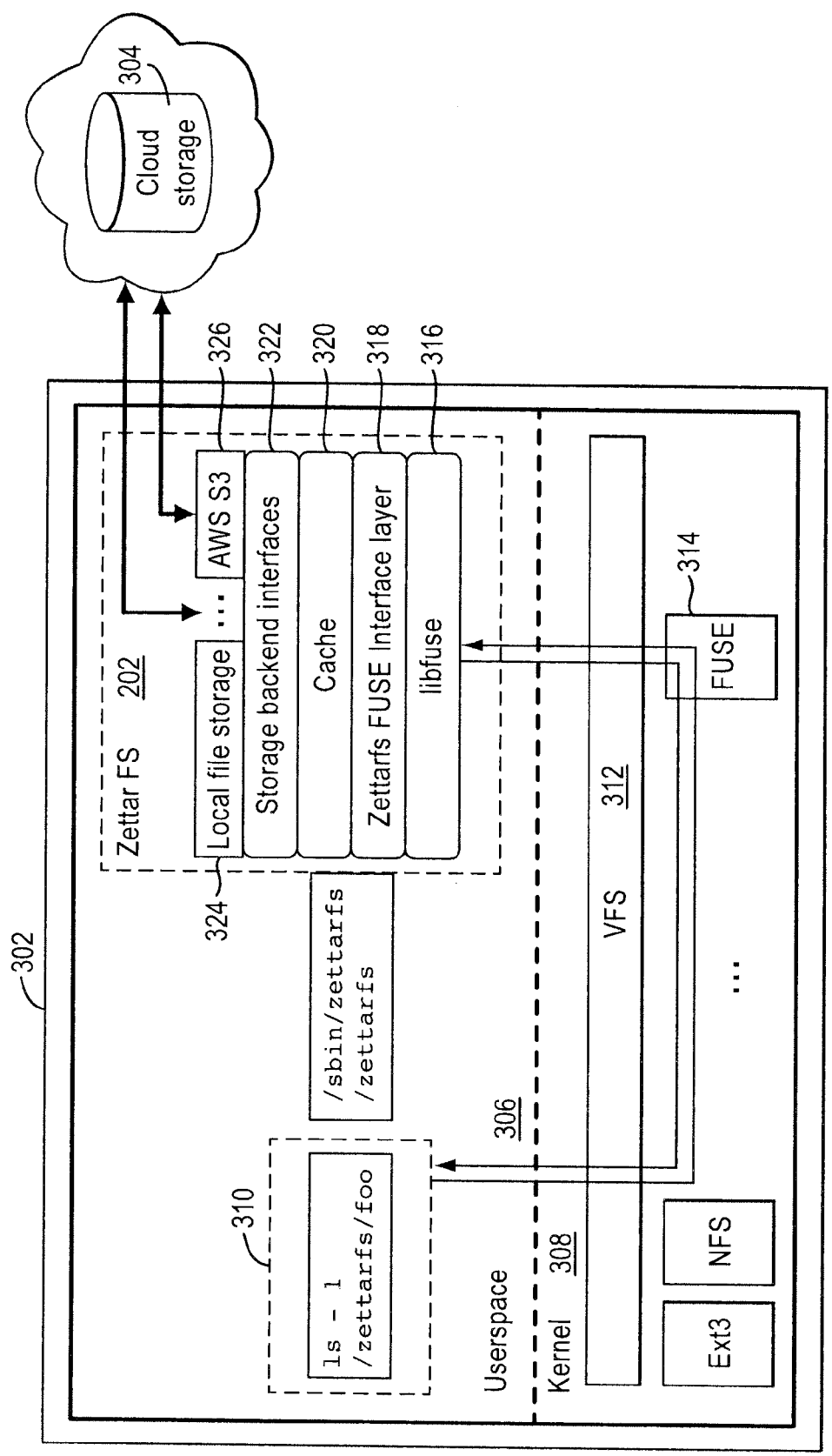
FIG. 3 depicts a digital device with the ZettarFS in some embodiments.

FIG. 3 depicts a digital device 302 with the ZettarFS 202 in some embodiments. A digital device 302 may be in communication with the cloud storage 304. The digital device 302 comprises a userspace 306 and a kernel 308. The userspace 306 may comprise an application 310 and the ZettarFS 202. The kernel 308 may comprise a virtual file system 312 and a FUSE module 314.

Once installed, the ZettarFS 202 may connect over a network with the cloud storage 304 (e.g., Amazon Web Services (AWS) Simple Storage Service (S3)). The ZettarFS 202 may present the information stored on the cloud storage 304 to a user and/or application 310 through a unified façade (e.g., file system representation) available as a POSIX compliant local file system mounted at a desired mounting point.

The userspace 306 is any space that is managed by a user or administrator and includes, but is not limited to, applications, utilities, and files. The application 310 (e.g., hosted application) may be any application that is configured to store data, retrieve data, or interact with a storage device (e.g., hard drive, cloud-based storage, or the like). In the example depicted in FIG. 3, the application 310 provides for a command listing files in a particular directory. The userspace 306 may also comprise the ZettarFS 202 which may comprise a software program (e.g., the ZettarFS 202 may be an application), hardware module, or combination of both.

The kernel 308 is any space that comprises or communicates with a file system and/or an operating system. The VFS 312 is any virtual file system. Those skilled in the art will appreciate that although the kernel 308 is depicted with a virtual file system, any file system may be used with various embodiments. In some embodiments, the kernel 308 comprises or communicates with multiple virtual machines. All or some of the virtual machines may be configured to run on the digital device's local storage.

In various embodiments, an application in the userspace 306 (e.g., application 310) generates system calls (e.g., related to file operations). The OS kernel 308 may receive the calls and hand them to the VFS 312. The VFS 312, after determining which device driver should handle the calls, provides the calls to the FUSE module 314 (i.e., a FUSE driver). The FUSE module 314 may then communicate with the libfuse 316. The calls may then be broken apart as appropriate (e.g., request and caching). Depending on the configuration, different cloud storage backend interfaces 322 may be used to communicate with different storage clouds. A local file storage back-end 324 may also be available.

The FUSE module 314 may be any software or hardware configured to direct commands to and from the ZettarFS 202. In some embodiments, the FUSE module 314 is a driver for the kernel 308. In one example, the application 310 directs a command to the VFS 312. The FUSE module 314 may direct the command to the ZettarFS 202 which may then communicate with the cloud storage 304. Any responses from the cloud storage 304 (e.g., a listing of files and/or directories of the zettarfs/foo directory) may be provided by the zettarfs 202 to the VFS 312. The FUSE module 314 may provide the response to the application 310.

The ZettarFS 202 may comprise a libfuse 316, a ZettarFS FUSE interface layer 318, a cache 320, a storage backend interfaces 322, a local file storage 324, and an AWS S3 module 326. In some embodiments, the functions of the ZettarFS 202 are transparent to the application 310. In one example, the storage backend interfaces 322 of the ZettarFS 202 may direct data to the cloud-based storage 304 and/or the local file storage 324.

The libfuse 316 may be a component of the FUSE module 314. The ZettarFS FUSE interface layer 318 may implement an interface with the libfuse 316. In one example, the ZettarFS FUSE interface layer 318 employs a C++ language binding to interface with the libfuse API. In some embodiments, the ZettarFS FUSE interface layer 318 (in interaction with an operating system's virtual file system (e.g., VFS 312) and the FUSE system (e.g., the FUSE module 314 and the libfuse 316)) is capable of representing a unified API to running applications on the digital device 302 (e.g., such as the application 310) as a complaint file system (e.g., such as a POSIX compliant file system).

In some embodiments, one or more components of the ZettarFS 202 may log actions. For example, one or more components may utilize the Boost Logging Library v2 and a Singleton pattern to optionally log actions. In one example, an activity log may be generated on demand for debugging and testing, for example. Logging is further described herein.

Various figures described herein depict a UNIX or linux operating system. Those skilled in the art will appreciate that any operating system may be used in conjunction with various embodiments including, but not limited to MICROSOFT WINDOWS.

The cache 320 may provide block-level caching of data maintained by the ZettarFS 202. In some embodiments, the cache 320 reduces network interactions with remote storage devices (e.g., like the cloud storage 304). The cache 320 may be a cache engine.

The storage backend interfaces 322 may provide connectivity and abstraction of protocol requests performed when interacting with different cloud storage services. In various embodiments, the storage backend interfaces 322 may be capable of concurrently directing data transfer to one or more preferred storage resources according to a set of configurable usage policies. In one example, a usage policy is configured to take advantage of features of different cloud storage systems 304 or storage devices within the cloud storage systems 304. For example, the usage policy may be configured to take advantage of performance, capacity, availability, price, and features of multiple different cloud storage systems and or storage devices.

In various embodiments, the ZettarFS 202 may allow concurrent data de-duplication, snapshot, and data replication for multiple storage resources. The desired operation may be applied to a unified API and the results may be applicable transparently and concurrently to underlying storage resources.

Those skilled in the art will appreciate that the ZettarFS 202 may be operating in one or more virtual machines by the digital device 302.

In various embodiments, systems and methods described herein may take advantage of available features of different remote storage devices. For example, one remote storage device solution may be cheaper when compared to others and another remote storage device solution may have better performance. Different remote storage device solutions may differentiate themselves in any number of ways, including, for example, performance, capacity, availability, price, and available services supported (e.g., sharing multiple storage resources concurrently with one or more computing devices, concurrent data de-duplication, snapshot, and data replication).

Those skilled in the art will appreciate that some embodiments described herein may work with other technologies may provide additional benefits. For example some embodiments described herein may be used with KVM's live migration. Benefits that may be obtained may include, for example, availability of an inexpensive content delivery network and web site fallback.

In various embodiments, the ZettarFS 202 may perform load balancing wherein data may be stored to different storage devices based on availability (e.g., the storage is currently busy) and/or available capacity (e.g., the storage device is 90% full). In one example, the ZettarFS 202 may process a command to store one or more files. The ZettarFS 202 may make the determination based on features of the available storage devices, utilization of the storage devices, availability, cost, and/or any other criteria. The criteria may be configured as a usage policy or otherwise modified and/or created by an administrator.

The ZettarFS 202 may also migrate (e.g., transfer) data from one storage device to another. In some embodiments, the ZettarFS 202 may migrate data based on any criteria in order to improve utilization, availability, cost, and/or any other criteria related to storage of data. In some embodiments, a user interface displaying a file system representation of the data will not be affected by migration or partial migration of data from one storage device to another.

Figure 4:
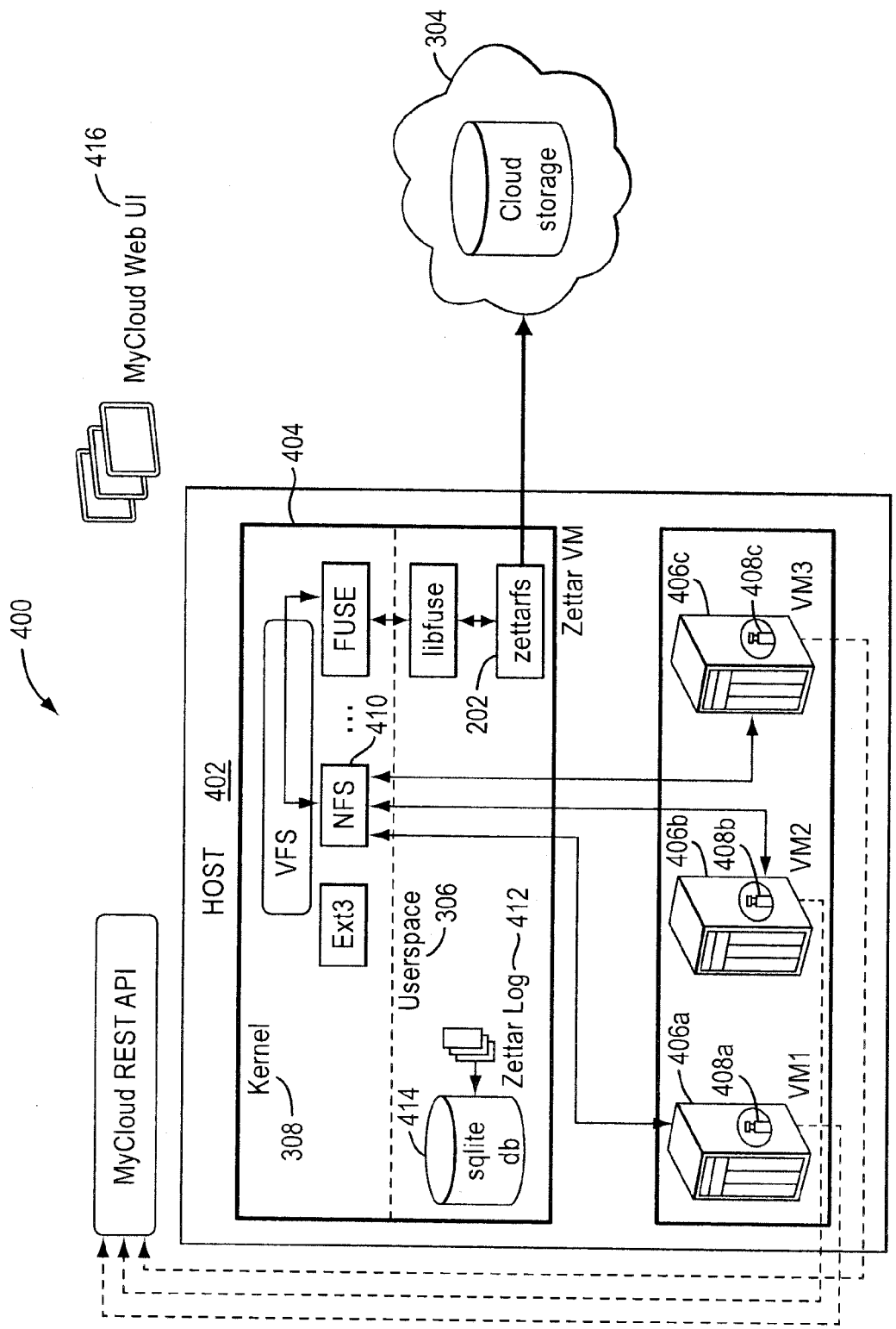
FIG. 4 depicts an architecture in some embodiments.

FIG. 4 depicts an architecture 400 in some embodiments. The architecture 400 comprises a host 402 in communication with the cloud storage 304. The host 402 may comprise the Zettar virtual machine 404 (e.g., Zettar VM). The Zettar VM 404 may comprise the kernel 308 and the userspace 306 as well as the ZettarFS 202. The host 402 may also comprise a plurality of other virtual machines 406a-c, each with an agent 408a (e.g., a Zettar agent). In some embodiments, the agent 408a-c may direct data calls to be handled by the Zettar VM 404. As a result, there is no duplication of services.

Those skilled in the art will appreciate that the Zettar VM 404 may also comprise a database (e.g., SQLite) and a Zettar log 412 which are both described herein.

Each virtual machine (e.g., the Zettar VM 404 as well as virtual machines 406a-c) may be in communication with a user interface that provides a file system representation (e.g., the myCloud Web UI). The file system representation may be a unified file system representation where files appear to be locally stored. Requests regarding data may then be received and processed with the correct API as necessary by the Zettar VM 404 thereby. In some embodiments, making the physical location(s) of the file not relevant to a calling application.

Figure 5:
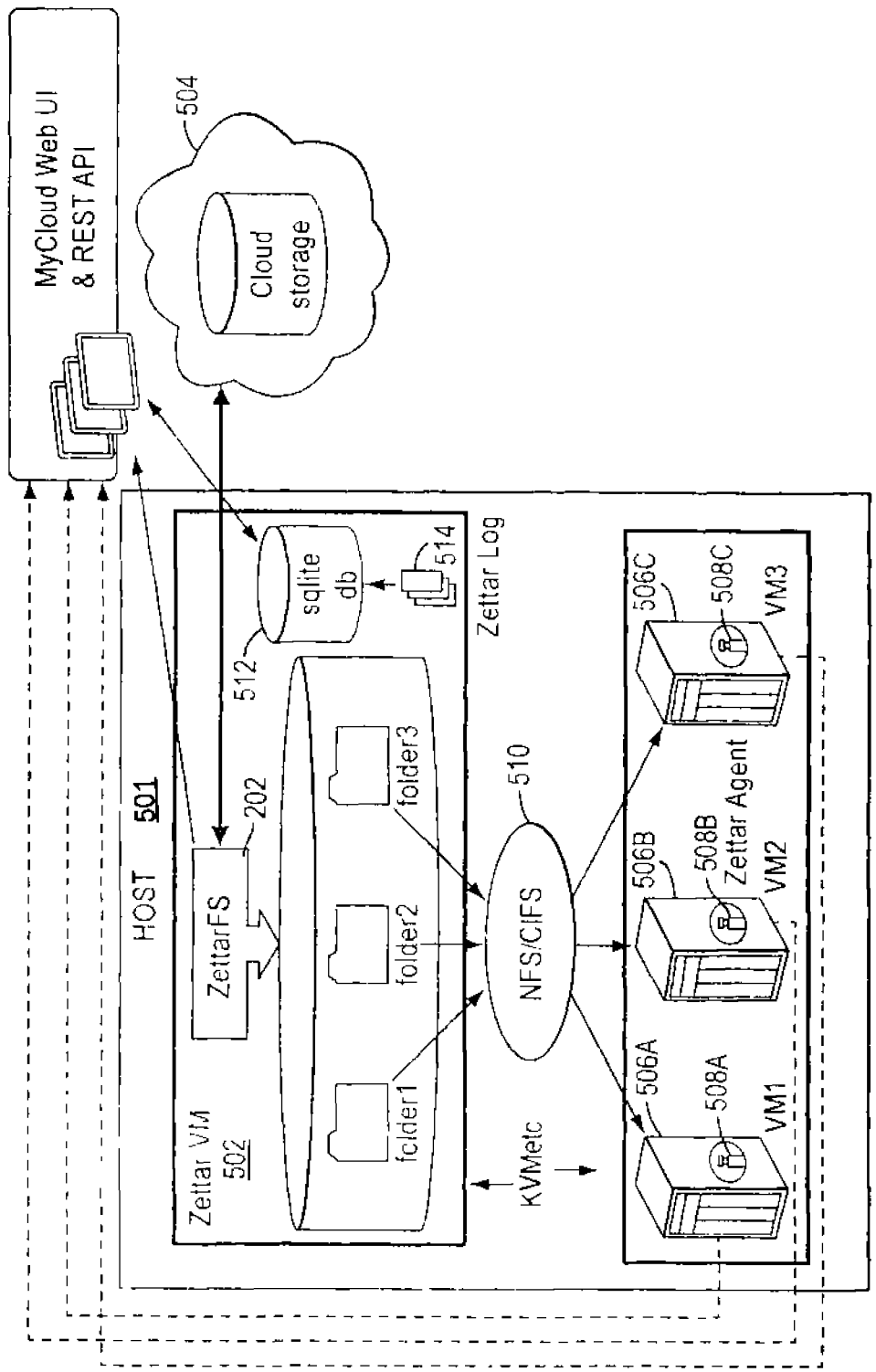
FIG. 5 depicts a host in communication with the cloud storage in another embodiment.

FIG. 5 depicts a host 501 in communication with the cloud storage 504 in another embodiment. The host 501 comprises a Zettar VM 502, as well as virtual machines 506a-c. Each of the virtual machines 506a-c comprise a Zettar agent 508a-c. The virtual machines 506a-c may be in communication with the Zettar VM 502 via NFS/CIFS 510. The Zettar VM 502 may comprise a Zettar log 514 and, optionally, a database 512 such as a SQLite database.

A user may interact with a user interface (e.g., displaying the file system representation) to store data, retrieve data, and/or manage storage resources. In one example, the myCloud Web UI comprises the user interface. The user interface may be web-based. In some embodiments, the ZettarFS 202 generates the UI (e.g., the myCloud UI). Those skilled in the art will appreciate that a utility on any digital device may generate the UI. The UI may interact with the ZettarFS 202 and log activities with the Zettar log 514.

In some embodiments, the ZettarFS 202 provides a single transaction log. The Zettar log 514 may parse the log and store the results in the database 512. The UI may have access to the database 512. In one example, the Zettar log 514 may periodically access a transaction log generated by the ZettarFS 202. The Zettar log 514 may parse the transaction log and generate usage data over a desired time span for one or more users or virtual machines. The usage data may be stored in the database 512. The usage database may then be accessed via the user interface or any external software.

The Zettar log 514 and/or database 512 may be available to multiple ZettarFS 202 systems on multiple digital devices and/or multiple virtual machines. In one example, the information within the Zettar log 514 and/or the database 512 may be shared with multiple ZettarFS 202 and/or virtual machines in order to keep track of the location(s) of files. In some embodiments, different systems provide information to a UI that provides a file system representation of files stored by multiple different ZettarFS 202.

The user interface may present a unified browsable (e.g., web-based) file system representation. Further, the user interface may allow management of the file system as if the resources were on a local machine. In some embodiments, the user interface may perform these functions because the ZettarFS 202, the VFS layer, and/or the FUSE module 314 (see FIG. 3) present underlying multiple storage resources as a unified file system (e.g., a unified POSIX file system).

The UI may comprise three components including a manage component, a track component, and a browse component. The manage component (see FIG. 10) may allow qualified parties to setup users, assign user roles, group membership, and enable/disable ZettarFS accesses for a particular user. A qualified party may be, for example, a server administrator, a manager, a reseller, or a VM operator (e.g., a VPS account owner).

The track component (see FIG. 11) may be configured to allow server administrators and users to keep track of cloud storage usage, billing information, and histories. In one example, the track module provides and/or generates tables and graphs. The track component may use information from the database 512 (e.g., information stored by the Zettar log 514). In one example, the track component uses the information from the database 512 to prepare reports (e.g., in tabulated and/or graphical form).

The browse component (see FIG. 12) may be configured to allow server administrators and users to view and optionally manage the content stored in cloud storage. The UI as described herein may appear within the browse component.

In some embodiments, the myCloud web UI, ZettarFS 202, and Zettar log 514 share configuration information (e.g., stored in a SQLite database).

In some embodiments, the user interface and/or the ZettarFS 202 provides a set of standard API (e.g., REST API). The API may enable external software applications to automate one or more tasks (e.g., using the manage and track components of the user interface). Tasks may include, for example, mount, unmount, browse, populate, and clean-up the unified file system (as well as any underlying file systems provided by ZettarFS 202).

Each of the virtual machines 506a-c may comprise a Zettar agent 508a-c. The Zettar agent 508a may interact with the user interface (e.g., via a standard API such as the REST API).

Figure 6:
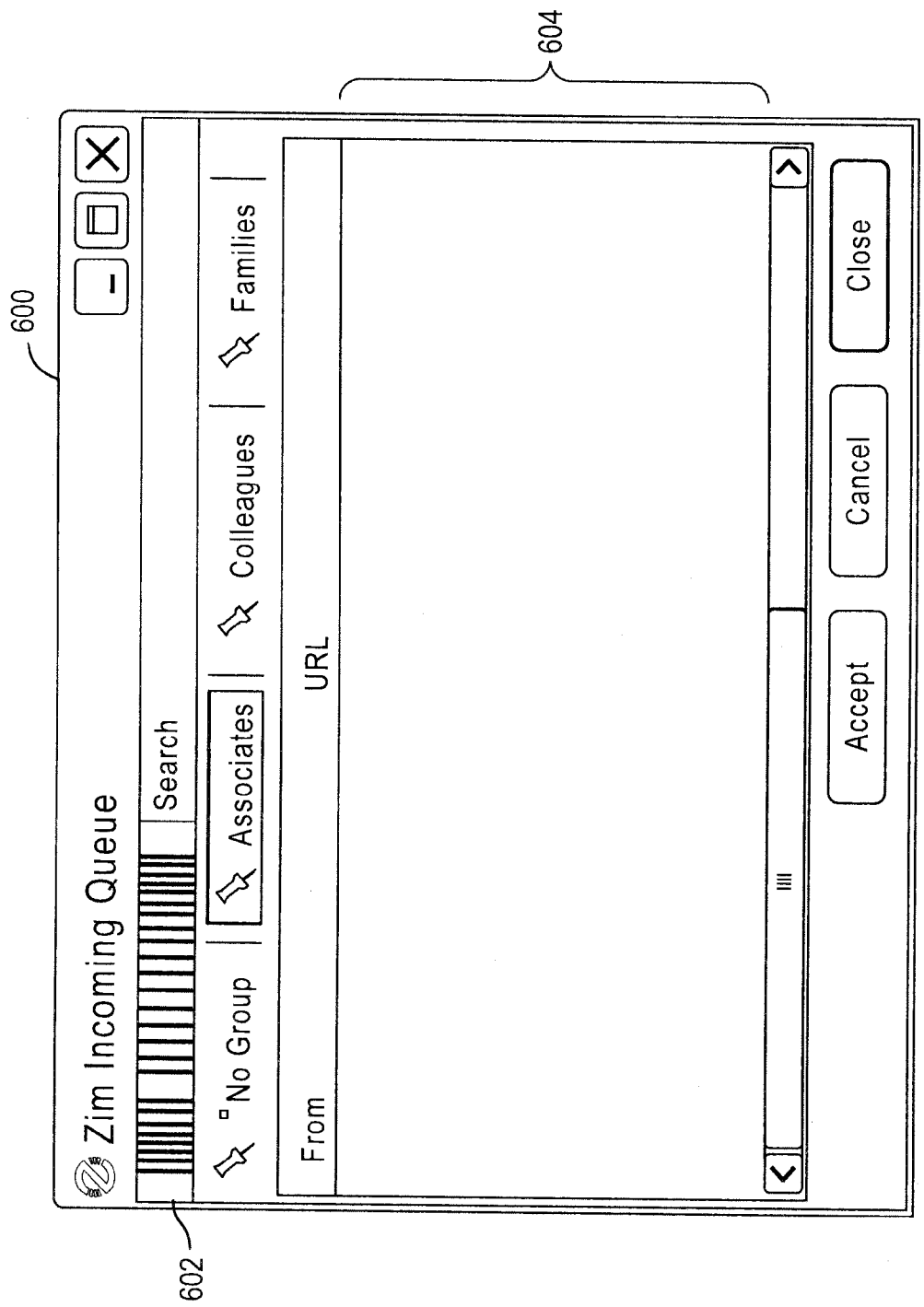
FIG. 6 depicts a graphical user interface in some embodiments.

FIG. 6 depicts a graphical user interface 600 in some embodiments. The user interface described in FIG. 5 (e.g., the myCloud UI) may comprise the graphical user interface 600. The graphical user interface 600 may comprise a thumb-wheel-like element 602 for scrolling the window 604. In some embodiments, the thumb-wheel-like element 602 may provide for efficient space control over a traditional scroll bar based mechanism and/or traditional touch screen-based mechanisms.

In some embodiments, a user may click on one side of the thumb-wheel-like element 602 to scroll the window 604 in that direction. The user may also be able to click on the thumb-wheel-like element 602 and drag the thumb-wheel-like element 602 thereby allowing controlled scrolling of the window 604. For example, the user may click on the left of the thumb-wheel-like element 602 and, while holding the mouse button, drag the mouse cursor to the right, thereby causing the windows 604 to scroll to the right. While the thumb-wheel-like element 602 is element, the thumb-wheel-like element 602 may be animated to appear as if the thumb-wheel-like element 602 is moving (e.g., turning like a wheel). In some embodiments, instead of using a mouse to control the cursor, the user may also use a touch screen in a similar manner.

The thumb-wheel-like element 602 may be used to scroll any information. For example, the thumb-wheel-like element 602 may be used to scroll tabs or other visual markers. Further, the thumb-wheel-like element 602 may be vertical rather than horizontal. In one example, the thumb-wheel-like element 602 may be used to scroll the page 604, tabs, or any information vertically rather than horizontally.

Those skilled in the art will appreciate that the thumb-wheel-like element 602 may be used in any graphical user interface.

Figure 7:
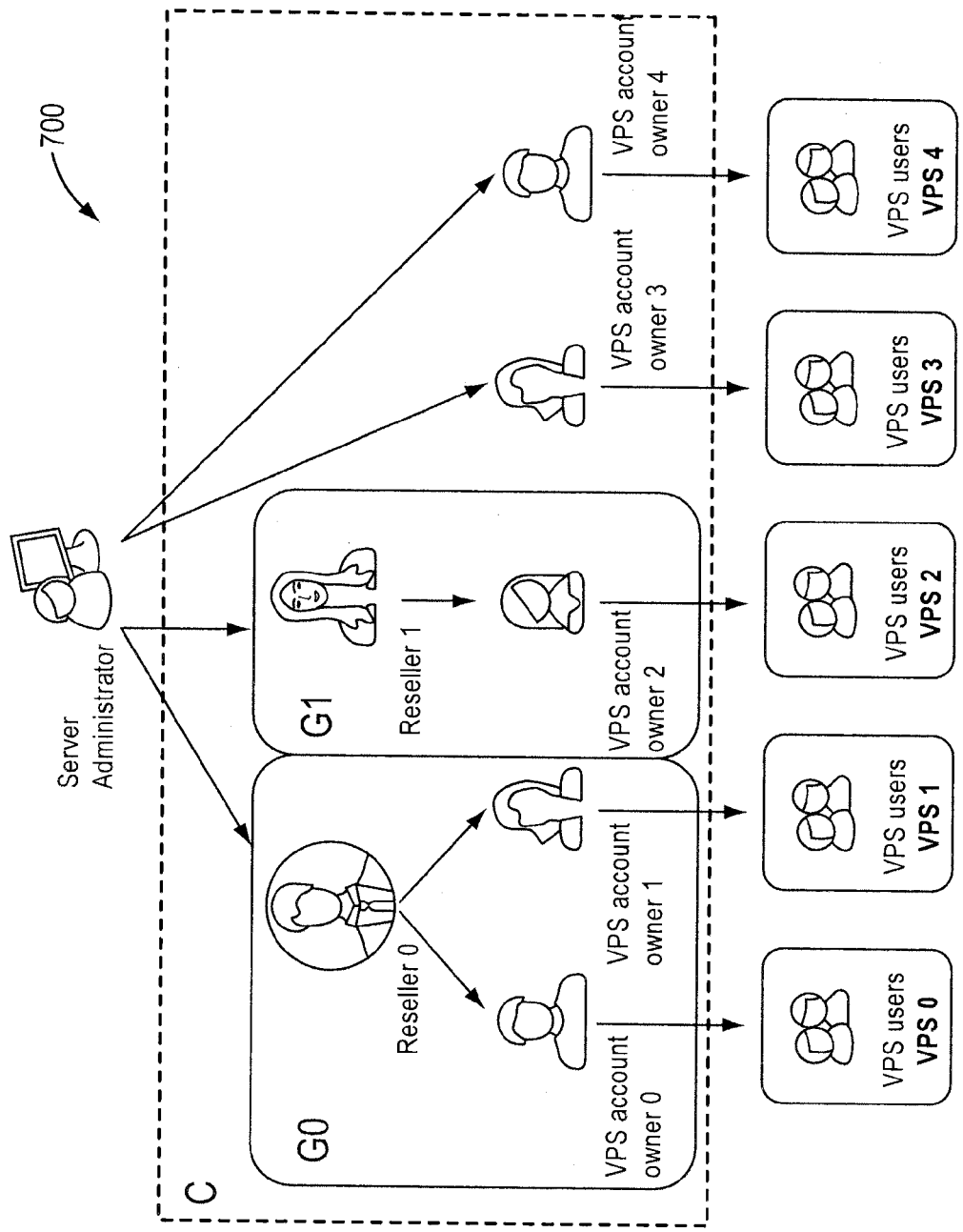
FIG. 7 depicts a diagram depicting multi-level role based permission control in some embodiments.

FIG. 7 depicts a diagram depicting multi-level role based permission control in some embodiments. In some embodiments, an administrator may control the permissions of other users. The reseller may control the permissions of owners of a VPS accounts who, in turn, may control the permissions of one or more users. Permissions may be controlled by membership of groups or individually. Those skilled in the art will appreciate that there are many ways to configure the system and provide permissions.

In some embodiments, the UI provides an administrator the ability to govern the rights of one or more other users as well as control the services available. In one example, the administrator may generate or configure usage policies to limit storage requests associated with one user, group of users, digital device, or group of digital devices to one or more cloud-based storage services. Further, the usage policy may be configured to take advantage of the various benefits of the cloud-based storage. For example, files or systems that require speed may be associated with faster cloud-based storage while those files or systems that require reliability may be associated with a service that provides high reliability. In some embodiments, a permission engine is configured to manage data access rights as described herein.

In various embodiments, the ZettarFS 202 is configured with a provisioning engine operative to provision additional storage devices as needed. For example, the ZettarFS 202 may be configured by a provisioning engine to take advantage of a newly available cloud-based storage service.

Figure 8:
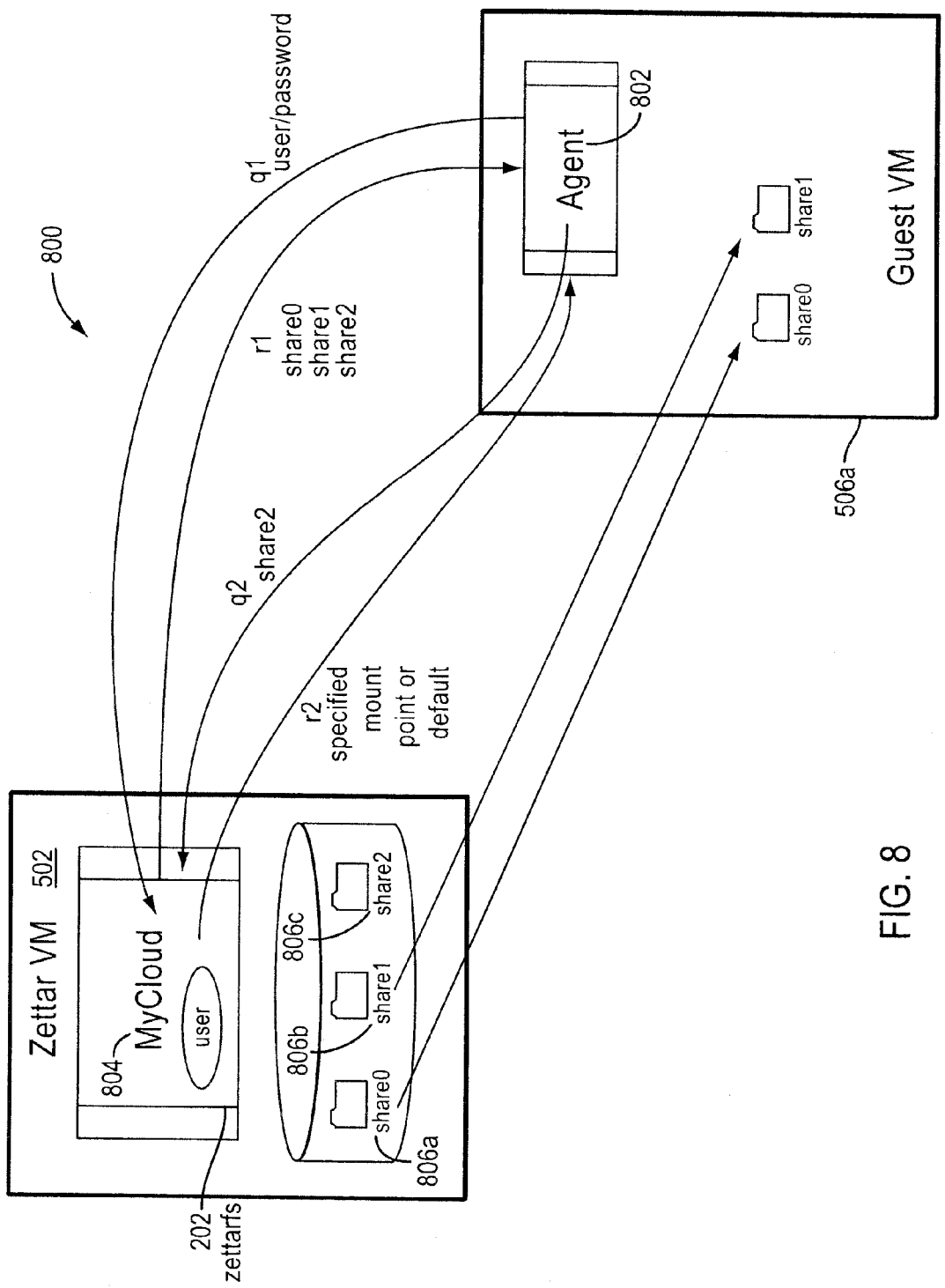
FIG. 8 depicts an environment depicting communication between a Zettar VM and a virtual machine.

FIG. 8 depicts an environment 800 depicting communication between a Zettar VM 502 and a virtual machine 506a. In some embodiments, the agent 802 on the virtual machine 506a is in communication with ZettarFS 202 via a user interface 804.

The agent 802 (e.g., a Zettar agent 508a) residing on the virtual machine 506A (e.g., guest VM) may be in communication with the ZettarFS 202 which resides on the Zettar VM 502). The agent 802 may communicate via the user interface 804 (e.g., myCloud) with the ZettarFS 202. In one example, q1 denotes a REST query issued by the agent 802. The ZettarFS 202 may provide a REST reply as r1. The agent 802 may then issue another REST query, q2. In response, the ZettarFS 202 may provide a second REST reply as r2.

The agent may reside on the virtual machine 506a as a daemon. The agent may periodically send queries (e.g., polling) to the user interface using the user interface's standard API (e.g., REST API). The agent 802 may, depending on conditions and policies stored in the database 512, make available all or a portion of the file system representation on the virtual machine 506a.

FIG. 8 also depicts that certain resources may be shared between the Zettar VM 502 and the guest VM 506a. The term "share" used in FIG. 8 may indicate a sub-directory that exists in a POSIX file system presented by the ZettarFS 202. The sub-directory may be represented by the user interface as web-based file system. Other forms of sharing may also be possible.

As depicted in FIG. 8, q1 indicates user/password. The user and password may denote a set of credentials for authentication before full access to the user interface is granted.

Figure 9:
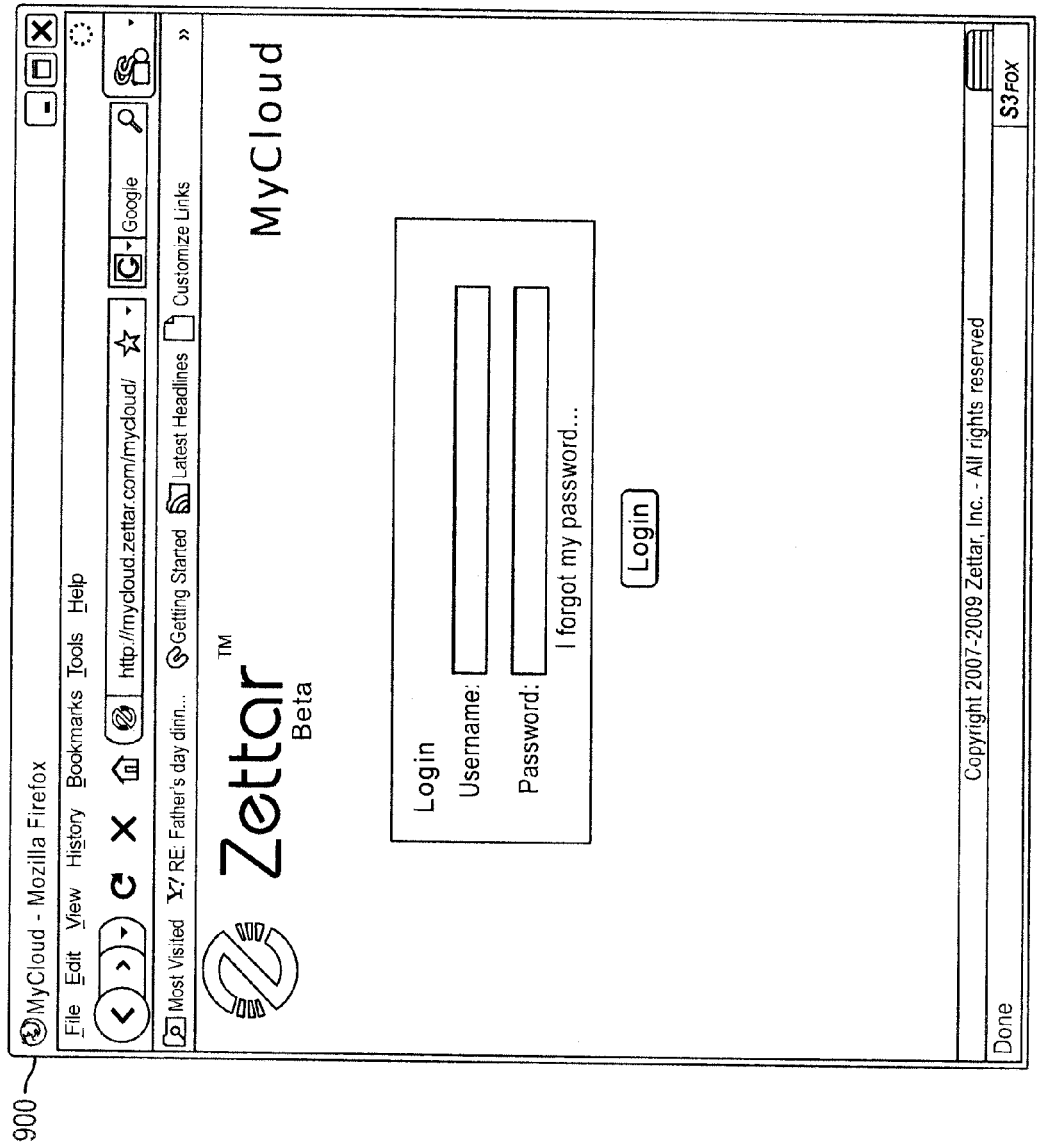
FIG. 9 depicts a login screen on a user interface in some embodiments.

FIG. 9 depicts a login screen 900 on the user interface in some embodiments. As discussed herein, the user interface may be web-based. For example, the user interface may appear in a web browser. Those skilled in the art will appreciate that the user interface may be a separate application and/or may not appear in a web browser. In some embodiments, a user or administrator may be required to provide a username and/or password before gaining access and/or rights.

In some embodiments, a user may login via the login user interface. Depending on the user's role that may be established via the user interface described in FIG. 7, the user interface may show appropriate functions (e.g., functions of which the user has access or permissions). The user may then, for example, access the browse, manage, and track components of the user interface to drill down and carry out appropriate tasks.

In various embodiments, in order to use the user interface standard API (e.g., REST API), an external software may have the correct API authentication credentials.

Figure 10:
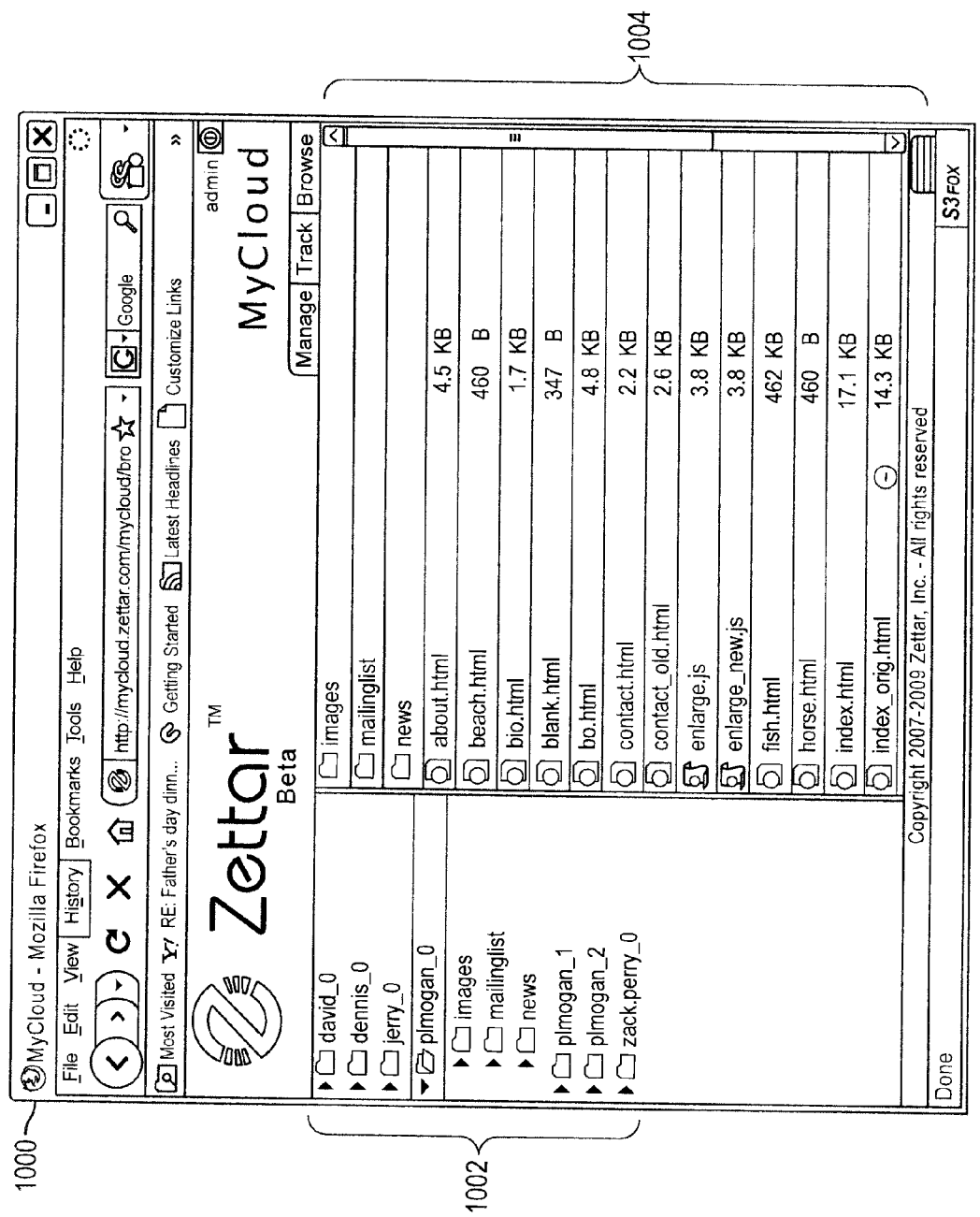
FIG. 10 depicts a browse screen on a user interface in some embodiments.

FIG. 10 depicts a browse screen 1000 on a user interface in some embodiments. The browse screen 1000 (e.g., part of the browse component of the myCloud system) may depict a series of directories 1002 and a series of files 1004. The directories 1002 may be any directories. In one example, after a user logs into the system (e.g., via the login screen 900), the user will see only those directories that the user has rights to view. The directories may be stored locally, remotely (e.g., on a cloud storage device), or in any combination of both locally and remotely. For example, the david_0 may be stored locally but the dennis_0 directory may be stored in a cloud-based storage system. Similarly, when the user view files 1004, the user may only view those files they have rights to view. The files may be of any file type. Further, the files may be stored locally, remotely, or in any combination of both locally and remotely. For example, the beach.html file may be stored in a first cloud-based storage system, the fish.html may be stored locally, and the index_orig.html may be stored in a second cloud-based storage system.

FIG. 11 depicts a manage screen 1100 on a user interface in some embodiments. The manage screen 1100 (e.g., part of the manage component of the myCloud system) may allow an administrator or manager to control rights or characterize users. For example, users may be identified by username, email address, and role. Managers of users may also be identified. In some embodiments, a user may be selected and their rights modified, added, or removed as necessary. The rights may be to directories, files, hard drives, extra functionality, or the like.

Figure 12:
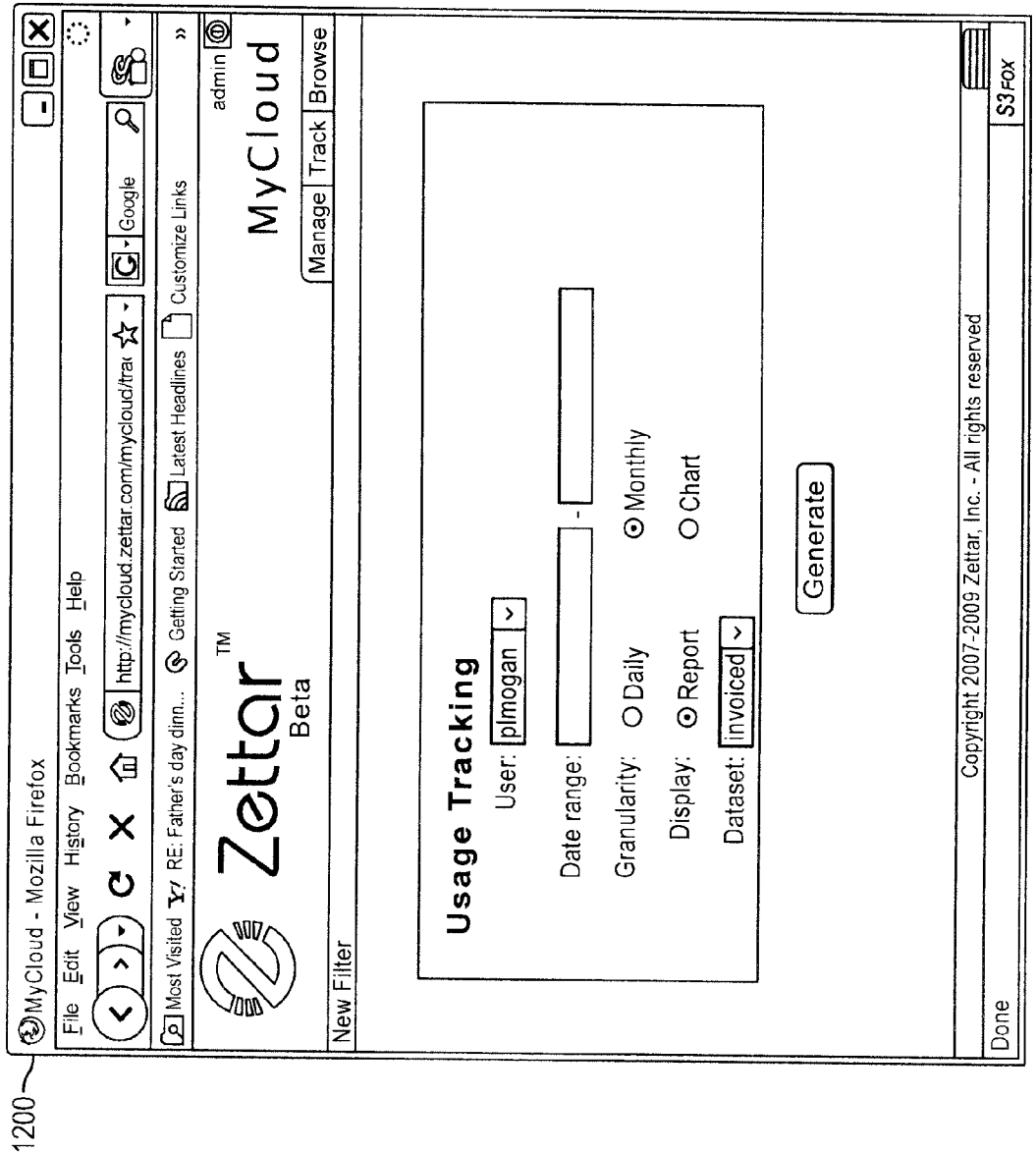
FIG. 12 depicts a track screen on a user interface in some embodiments

FIG. 12 depicts a track screen 1200 on a user interface in some embodiments. The track screen 1200 (e.g., part of the track component of the myCloud system) may allow an administrator or manager to track activities (e.g., via the Zettar log). In one example, a user (or group of users) may be selected. The administrator or manager may request a report, for example, that is related to the user (e.g., by username), digital device, storage resource, and/or cloud storage system. The administrator or manager may enter a rate, control the level of granularity and the format of the output. Those skilled in the art will appreciate that there are many ways to search and retrieve information regarding the activities related to the ZettarFS 202.

Figure 13:
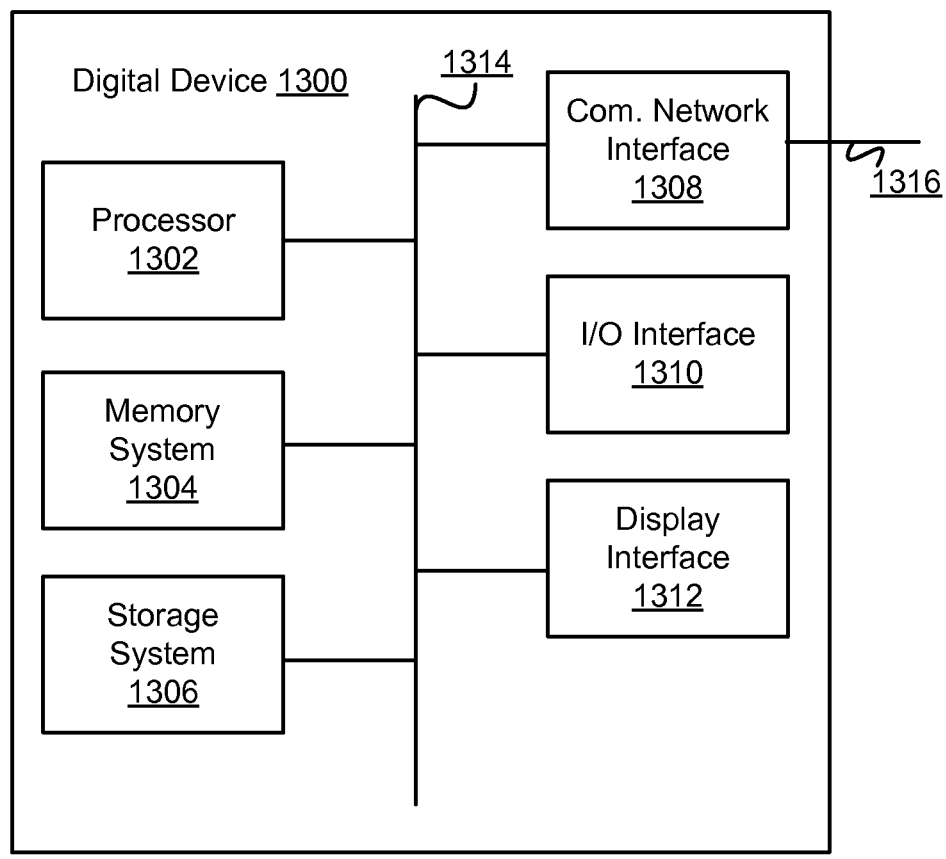
FIG. 13 is a block diagram of a digital device in which various embodiments may be practiced.

FIG. 13 is a block diagram of a digital device 1300 in which various embodiments may be practiced. The digital device 1300 comprises a bus 1314 in communication with a processor 1302, a memory system 1304, a storage system 1306, a communication network interface 1308 communicatively coupled to a communication channel 1316, an input/output device 1310, and a display interface 1312. The processor 1302 is configured to execute executable instructions (e.g., programs). In some embodiments, the processor 1302 comprises circuitry or any processor capable of processing the executable instructions.

The memory system 1304 stores data. Some examples of memory system 1304 include storage devices, such as RAM, ROM, RAM cache, virtual memory, etc. In various embodiments, working data is stored within the memory system 1304. The data within the memory system 1304 may be cleared or ultimately transferred to the storage system 1306. The storage system 1306 includes any storage configured to retrieve and store data. Some examples of the storage system 1306 include flash drives, hard drives, optical drives, and/or magnetic tape. Each of the memory system 1304 and the storage system 1306 comprises a computer-readable medium, which stores instructions or programs executable by processor 1302.

The communication network interface (com. network interface) 1308 may be coupled to a network via the communication channel 1316. The communication network interface 1308 may support communication over an Ethernet connection, a serial connection, a parallel connection, and/or an ATA connection. The communication network interface 1308 may also support wireless communication (e.g., 802.11 a/b/g/n, WiMax, LTE, WiFi). It will be apparent to those skilled in the art that the communication network interface 1308 can support many wired and wireless standards.

The input/output device 1310 is any device such an interface that receives inputs data (e.g., via mouse and keyboard). The display interface 1312 is an interface that outputs data (e.g., to a speaker or display). Those skilled in the art will appreciate that the storage system 1306, input/output device 1310, and display interface 1312 may be optional.

The above-described functions and components can be comprised of instructions that are stored on a storage medium (e.g., a computer readable storage medium). The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A system, comprising:
   a first cloud storage resource, including at least one processor, operative to store first data thereon, the first cloud storage resource using a first program interface for data communication, and the first cloud storage resource providing at least a first feature set, wherein the first feature set includes any of a concurrent data de-duplication feature, a snapshot feature, or a data replication feature;
   a second cloud storage resource operative to store second data thereon, the second cloud storage resource using a second program interface, different than the first program interface, for data communication, the second cloud storage resource providing a second feature set that is different than the first feature set;

a user interface configured to receive a desired storage resource benefit from an administrator of a hosted application;

a proxy engine operative to:
  receive a data request from the hosted application communicated using a third program interface, the data request requesting to store third data; and
  select either the first cloud storage resource or the second cloud storage resource as a selected storage resource to handle the data request based on the first feature set, the second feature set and the desired storage resource benefit; and a proxy interface operative to:
  translate the data request from the third program interface to a program interface used by the selected storage resource, the program interface used by the selected storage resource being one of the first program interface or the second program interface; and
  communicate the data request to the selected storage resource using the program interface used by the selected storage resource.

2. The system of claim 1, wherein the proxy interface includes a graphical user interface for enabling a user to access the first cloud storage resource and the second cloud storage resource as a unified resource.

3. The system of claim 1, wherein the proxy interface includes an application program interface for enabling automatic access by the hosted application.

4. The system of claim 1, wherein the first cloud storage resource includes one of local storage resource or network storage.

5. The system of claim 1, wherein the first program interface and the second program interface use different storage protocols.

6. The system of claim 1, wherein the proxy interface includes a load balancing engine operative to balance loads across the first cloud storage resource and the second cloud storage resource.

7. The system of claim 1, wherein the proxy interface includes a provisioning engine operative to provision additional storage resources as needed.

8. The system of claim 1, wherein the first program interface is operative to access the first cloud storage resource and at least one other storage resource that uses a same protocol.

9. The system of claim 1, wherein the proxy interface is further operative to redirect requests received from the hosted application.

10. The system of claim 1, wherein the proxy engine is further operative to receive a second data request from a second hosted application.

11. The system of claim 1, wherein the proxy interface includes a caching engine for caching at least a portion of application data.

12. The system of claim 1, wherein the proxy interface includes a permission engine operative to manage data access rights.

13. The system of claim 1, wherein the proxy interface includes an operating system component for redirecting file-system data requests.

14. The system of claim 1, wherein the proxy interface includes a migration engine operative to migrate data across storage resources.

15. A method, comprising:

receiving, via a user interface, a desired storage resource benefit from an administrator of a hosted application;

receiving, from the hosted application, a data request to store data, the data request transmitted by the hosted application using a first program interface;

selecting either a first cloud storage resource or a second cloud storage resource as a selected storage resource to handle the data request, the first cloud storage resource providing at least a first feature set that is different than a second feature set provided by the second cloud storage resource, the selection based on the first feature set, the second feature set and the desired storage resource benefit, wherein the first feature set includes any of a concurrent data de-duplication feature, a snapshot feature, or a data replication feature;

translating the data request from the first program interface to a second program interface used by the selected storage resource, the first cloud storage resource using a different program interface than the second cloud storage resource for data communication; and communicating the data request to the selected storage resource using the second program interface.

16. The method of claim 15, further comprising providing a graphical user interface that presents first data stored on the first cloud storage resource and second data stored on the second cloud storage resource and enables a user to access the first cloud storage resource and the second cloud storage resource as a unified resource.

17. The method of claim 15, further comprising using an application program interface for enabling automatic access by the hosted application.

18. The method of claim 15, wherein the first cloud storage resource includes one of local storage resource or network storage.

19. The method of claim 15, wherein the first program interface and the second program interface use different storage protocols.

20. The method of claim 15, further comprising using a load balancing engine to balance loads across the first cloud storage resource and the second cloud storage resource.

21. The method of claim 15, further comprising using a provisioning engine operative to provision additional storage resources as needed.

22. The method of claim 15, further comprising using the second program interface to access at least one other storage resource that uses a same protocol as the selected storage resource.

23. The method of claim 15, further comprising redirecting requests received from the hosted application.

24. The method of claim 15, further comprising receiving a second data request from a second hosted application.

25. The method of claim 15, further comprising using a caching engine for caching data.

26. The method of claim 15, further comprising using a permission engine to manage data access rights.

27. The method of claim 15, further comprising using an operating system component for redirecting file-system data requests.

28. The method of claim 15, further comprising using a migration engine to migrate data across storage resources.

29. A system, comprising:

means for receiving, via a user interface, a desired storage resource benefit from an administrator of a hosted application;

means for receiving, from the hosted application, a data request, the data request transmitted by the hosted application using a first program interface;

means for selecting either a first cloud storage resource or a second cloud storage resource as a selected storage resource to handle the data request, the first cloud storage resource providing at least a first feature set that is different than a second feature set provided by the second cloud storage resource, the selection based on the first feature set, the second feature set and the desired storage resource benefit, wherein the first feature set includes any of a concurrent data de-duplication feature, a snapshot feature, or a data replication feature;

means for translating the data request from the first program interface to a second program interface used by the selected storage resource, the first cloud storage resource using a different program interface than the second cloud storage resource for data communication; and means for communicating the data request to the selected storage resource using the second program interface.

* * * * *